US012374760B2

(12) United States Patent
Lee et al.

(10) Patent No.: US 12,374,760 B2
(45) Date of Patent: Jul. 29, 2025

(54) BATTERY MODULE AND METHOD OF MANUFACTURING THE SAME (71) Applicant: LG ENERGY SOLUTION, LTD., Seoul (KR)

(72) Inventors: Changje Lee, Daejeon (KR); Dae Ji Hong, Daejeon (KR); Kangil Lee, Daejeon (KR); Jaehyun Bae, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 687 days.

(21) Appl. No.: 17/765,593

(22) PCT Filed: Apr. 5, 2021

(86) PCT No.: PCT/KR2021/004195
§ 371 (c)(1),
(2) Date: Mar. 31, 2022

(87) PCT Pub. No.: WO2021/210829
PCT Pub. Date: Oct. 21, 2021

(65) Prior Publication Data
US 2022/0344779 A1    Oct. 27, 2022

(30) Foreign Application Priority Data
Apr. 13, 2020  (KR) .................. 10-2020-0044829

(51) Int. Cl.
H01M 50/505    (2021.01)
B23K 26/21     (2014.01)
(Continued)

(52) U.S. Cl.
CPC .......... H01M 50/505 (2021.01); B23K 26/21 (2015.10); H01M 50/536 (2021.01); H01M 50/54 (2021.01)

(58) Field of Classification Search
CPC .. H01M 50/505; H01M 50/54; H01M 50/536; B23K 26/21
(Continued)

(56) References Cited

U.S. PATENT DOCUMENTS

2003/0134193 A1    7/2003  Hanafusa et al.
2008/0026247 A1    1/2008  Nakagawa et al.
(Continued)

FOREIGN PATENT DOCUMENTS

CN    102140036 A    8/2011
CN    105215550 A    1/2016
(Continued)

OTHER PUBLICATIONS

International Search Report (PCT/ISA/210) issued in PCT/KR2021/004195 mailed on Aug. 4, 2021.
(Continued)

Primary Examiner — James M Erwin
(74) Attorney, Agent, or Firm — Birch, Stewart, Kolasch & Birch, LLP (57) ABSTRACT A battery module and a method of manufacturing the same includes: a battery cell stack including a plurality of battery cells, a bus bar frame connected to the battery cell stack, at least one electrode lead connected to the battery cell stack and containing a first metal; and a bus bar overlapping with the at least one electrode lead and containing a second metal, the at least one electrode lead and the bus bar are welded to form a welded portion, the welded portion includes a first region in which a central portion is located in the at least one electrode lead and a second region in which the central portion is located in the bus bar, and precipitates of the first metal and the second metal are distributed in both the first region and the second region.

18 Claims, 5 Drawing Sheets (51) Int. Cl.
*H01M 50/536* (2021.01)
*H01M 50/54* (2021.01)

(58) Field of Classification Search
USPC .......................................................... 429/160
See application file for complete search history.

(56) References Cited

U.S. PATENT DOCUMENTS

| | | |
|---|---|---|
| 2013/0130572 A1 | 5/2013 | Sakae |
| 2014/0127550 A1 | 6/2014 | Roh et al. |
| 2015/0251382 A1 | 9/2015 | Teresaki et al. |
| 2016/0031028 A1 | 2/2016 | Pereira et al. |
| 2016/0031042 A1 | 2/2016 | Gietzelt et al. |
| 2016/0114429 A1 | 4/2016 | Shioga et al. |
| 2018/0026252 A1 | 1/2018 | Kumazawa et al. |
| 2018/0194235 A1* | 7/2018 | Kim ........................ B60L 50/50 |
| 2018/0245616 A1 | 8/2018 | Kumazawa et al. |
| 2018/0269459 A1 | 9/2018 | Tsuchiya et al. |
| 2018/0308634 A1 | 10/2018 | Shimizu et al. |
| 2020/0108462 A1* | 4/2020 | Lee ........................ B23K 31/12 |
| 2020/0194768 A1 | 6/2020 | Choi et al. |
| 2020/0274133 A1 | 8/2020 | Masumura et al. |

FOREIGN PATENT DOCUMENTS

| | | |
|---|---|---|
| CN | 106229456 A | 12/2016 |
| CN | 107335916 A | 11/2017 |
| CN | 107639343 A | 1/2018 |
| CN | 108890128 A | 11/2018 |
| CN | 110140235 A | 8/2019 |
| CN | 111545905 A | 8/2020 |
| CN | 101112740 A | 4/2025 |
| DE | 10 2017 210 649 A1 | 12/2018 |
| EP | 2 995 414 B1 | 7/2017 |
| JP | 9-300087 A | 11/1997 |
| JP | 2011-140049 A | 7/2011 |
| JP | 2012-89254 A | 5/2012 |
| JP | 2012-138306 A | 7/2012 |
| JP | 2013-91089 A | 5/2013 |
| JP | 2014-121723 A | 7/2014 |
| JP | WO2015/159503 A1 | 10/2015 |
| JP | 2018-100210 A | 5/2016 |
| JP | 2017-147209 A | 8/2017 |
| JP | 2017-152703 A | 8/2017 |
| JP | 2018-12125 A | 1/2018 |
| KR | 10-2003-0060814 A | 7/2003 |
| KR | 10-1305250 B1 | 8/2013 |
| KR | 10-2015-0056534 A | 5/2015 |
| KR | 10-2017-0078362 A | 7/2017 |
| KR | 10-2018-0089129 A | 8/2018 |
| KR | 10-2019-0008135 A | 1/2019 |
| WO | WO 2017/047050 A1 | 3/2017 |

OTHER PUBLICATIONS

Extended European Search Report for European Application No. 21789000.3, dated May 23, 2024.

European Office Action for European Application No. 21 789 000.3, dated Feb. 18, 2025.

\* cited by examiner

BATTERY MODULE AND METHOD OF MANUFACTURING THE SAME

CROSS CITATION WITH RELATED APPLICATION(S)

This application claims the benefit of Korean Patent Application No. 10-2020-0044829 filed on Apr. 13, 2020 with the Korean Intellectual Property Office, the disclosure of which is incorporated herein by reference in its entirety.

TECHNICAL FIELD

The present disclosure relates to a battery module and a method of manufacturing the same, and more particularly, to a battery module having improved physical properties of welded portions, and a method of manufacturing the same.

BACKGROUND ART

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle or large-sized devices such as vehicles require high power and large capacity. Therefore, a middle or large-sized battery module having a plurality of battery cells electrically connected to one another is used.

Meanwhile, recently, along with a continuous rise of the necessity for a large-capacity secondary battery structure, including its utilization as an energy storage source, there is a growing demand for a battery pack of a multi-module structure which is an assembly of multiple battery modules in which a plurality of secondary batteries are connected in series and/or in parallel.

Meanwhile, when a plurality of battery cells are connected in series/parallel to configure a battery pack, a method of configuring a battery module composed of battery cells first, and then using at least one of the battery modules and adding other components to configure a battery pack is common.

In order for the battery cells to be electrically connected inside the battery module, the electrode leads are interconnected, and connection portions can be welded to maintain such a connection state. Moreover, the battery module can be electrically connected in parallel and/or series between the battery cells, and for this purpose, one end of the electrode lead can be fixed by a method such as welding to a bus bar for electrical connection between the battery cells.

In addition, the electrical connection between the battery cells is often configured by joining the electrode leads to the bus bar. At this time, in order to electrically connect the battery cells in parallel, the electrode leads having the same polarity are connected and joined to each other, and in order to electrically connect the battery cells in series, the electrode leads having different polarities are connected and joined to each other.

As described above, when the bus bar and the electrode lead are welded, the physical properties of the welded portion are deteriorated due to the precipitation of intermetallic compounds, and thus, tensile strength, fatigue life, and electrical conductivity can be deteriorated.

DETAILED DESCRIPTION OF THE INVENTION

Technical Problem

It is an object of the present disclosure to provide a battery module having improved physical properties of welded portions, and a method for manufacturing the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked, a bus bar frame connected to the battery cell stack, at least one electrode lead connected to the battery cell stack and containing a first metal; and a bus bar overlapping with the at least one electrode lead and containing a second metal, wherein the at least one electrode lead and the bus bar are welded to form a welded portion, wherein the welded portion includes a first region in which a central portion is located in the at least one electrode lead and a second region in which the central portion is located in the bus bar, based on a boundary surface between the at least one electrode lead and the to bus bar, and wherein precipitates of the first metal and the second metal are distributed in both the first region and the second region.

The battery module may further include cell terraces that respectively protrude from the plurality of battery cells adjacent to each other among the battery cells contained in the battery cell stack, wherein the at least one electrode lead includes a plurality of electrode leads protruding from the cell terraces, respectively, and having the same polarity, and wherein the plurality of electrode leads may overlap with the bus bar.

The battery module may further include a plating layer plated with a third metal on the bus bar between the plurality of electrode leads and the bus bar.

The first metal may include aluminum, and the second metal may include copper.

The plating layer may include nickel.

The precipitates may be dispersed within the welded portion.

The battery pack according to another embodiment of the present disclosure includes the above-mentioned battery module.

The battery module according to yet another embodiment of the present disclosure includes: a step of stacking the plurality of battery cells to form the battery cell stack, wherein the at least one electrode lead includes a plurality of electrode leads, a step of overlapping the bus bar with at least a first electrode lead of the plurality of electrode leads that respectively protrude from the battery cells adjacent to each other among the battery cells, and a step of welding the at least first electrode lead and the bus bar, wherein the step of welding the at least first electrode lead and the bus bar comprises: a step of preheating the at least first electrode lead with a laser having a first energy, and a step of welding the preheated at least first electrode lead and the bus bar with a laser having a second energy, and wherein the first energy is lower than the second energy.

The step of welding the at least first electrode lead and the bus bar may include a step of inducing a eutectic reaction between the first metal contained in the at least first electrode lead and the second metal contained in the bus bar.

In the step of welding the at least first electrode lead and the bus bar, an alloy concentration of the second metal mixed with the first metal may be 22 wt % to 52 wt %.

The welding speed of the step of preheating the at least first electrode lead may be higher than the welding speed of the at least first preheated electrode lead and the bus bar.

The method of manufacturing the battery module may further include a step of forming a plating layer plated with a third metal on the bus bar before the step of welding the at least first electrode lead and the bus bar.

The laser may have a pattern in which a laser beam is irradiated from a center to outside.

The pattern of the laser forms at least one curved shape.

The welding method according to a further embodiment of the present disclosure is a method of welding an electrode lead and a bus bar, which comprises: a step of preheating the electrode lead with a laser having a first energy, and a step of welding the preheated electrode lead and the bus bar with a laser having a second energy, to induce a eutectic reaction between a first metal contained in the electrode lead and a second metal contained in the bus bar.

Advantageous Effects

According to embodiments of the present disclosure, a step of preheating the electrode lead with a relatively low laser energy input and a step of welding the preheated electrode lead and the bus bar can be performed to control the alloy concentration between dissimilar metals and thus induce eutectic reactions, during the welding of the bus bar and the electrode lead.

Therefore, the melting point can be lowered, the cooling time during which the intermetallic compound precipitation is suppressed becomes longer, and thus, the precipitation control of the intermetallic compound becomes very advantageous.

In addition, after welding by the preheating step, the precipitates can be dispersed in the welded portion with sufficient melt fluidity through a slow cooling step, thereby increasing the tensile strength.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set torth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 1:
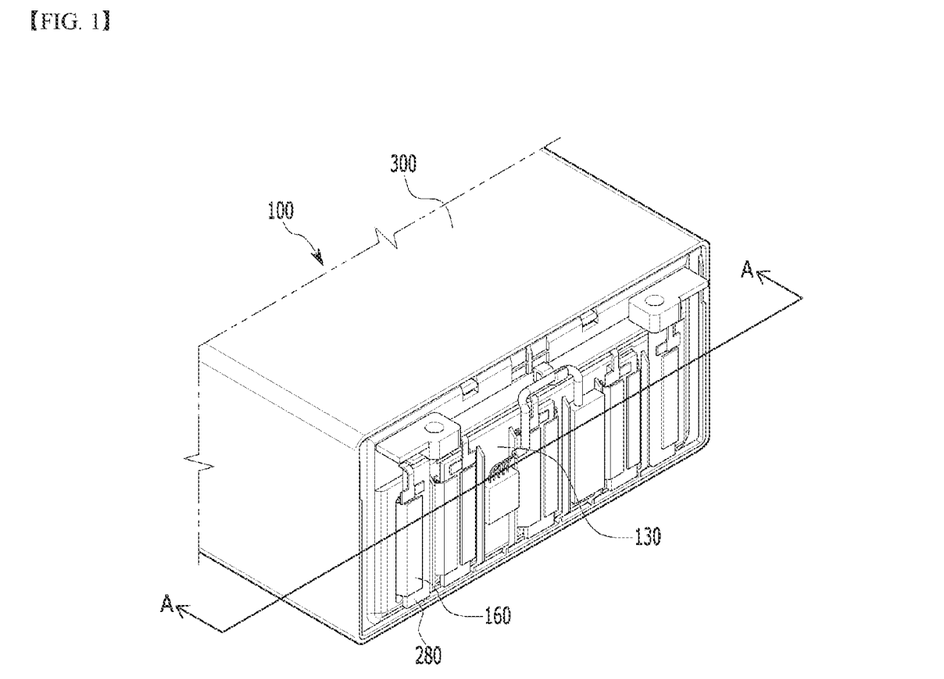
FIG. 1 is a perspective view showing a part of a battery module according to an embodiment of the present disclosure.
Figure 2:
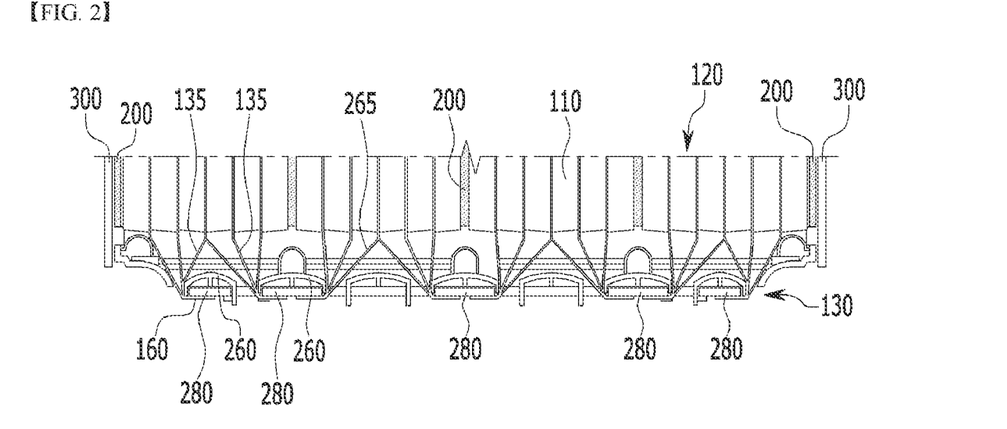
FIG. 2 is a cross-sectional view taken along the cutting line A-A' of FIG. 1.

FIG. 1 is a perspective view showing a part of a battery module according to an embodiment of the present disclosure. FIG. 2 is a cross-sectional view taken along the cutting line A-A' of FIG. 1.

Referring to FIGS. 1 and 2, the battery module 100 according to embodiments of the present disclosure includes a module frame 300, a battery cell stack 120 inserted into the module frame 300, and a bus bar frame 130 located on one open side of the module frame 300 and is connected to the battery cell stack 120. The battery cell stack 120 is formed by stacking a plurality of battery cells 110 in one direction.

The module frame 300 may be in the form of a mono frame covering four surfaces, except for the front surface and the rear surface of the battery cell stack 120. It means a type of frame that requires horizontal assembly in order to insert the battery cell stack 120 inside the mono frame. However, the module frame 300 is not limited to a mono frame, and may have a shape including a U-shaped frame of which an upper surface, a front surface, and a rear surface are opened, and an upper plate that covers the upper portion of the battery cell stack 120.

A cell terrace 135 extending from a pouch covering the battery cell 110 is formed, and electrode leads 160 protruding from the cell terrace 135 can meet and pass through one lead slot. The distance between adjacent cell terraces 135 may be increasingly narrower as the distance from the battery cell 110 increases. At this time, the electrode leads 160 protruding from the cell terrace 135 may have the same polarity as each other. When the electrode leads 160 adjacent to each other have different polarities from each other, the distance between the cell terraces 135 from which the electrode leads 160 protrude from each other may be rather widen more and more as it goes away from the battery cell 110.

According to embodiments of the present disclosure, a compression pad 200 is formed between the outermost battery cell 110 and the side surface portion of the module frame 300. The compression pad 200 may be formed using a polyurethane-based material. The compression pad 200 can absorb a deformation of the thickness of the battery cell 110 due to swelling and a change of the battery cell 110 due to an external impact. At least one compression pad 200 may be formed not only between the outermost battery cell 110 and the side surface portion of the module frame 300, but also between the battery cells 110 adjacent to each other.

A pass guider 260 is formed on the bus bar frame 130. Before forming the cell terrace 135 that allows the electrode leads 160 of each of the three adjacent battery cells 110 to be extended, the electrode leads 160 are guided so as to pass through the lead slot, and may be formed on one side of the bus bar frame 130. Specifically, the bus bar frame 130 may include a pass guider 260 inside the rear surface of the bus bar frame 130 located to be separated from the battery cells 110.

The pass guider 260 may form a predetermined guide space at the rear surface of the bus bar frame 130, so that the three electrode leads 160 and the cell terraces 135 can be brought close to each other before passing through the lead slot. The pass guiders 260 may be provided in plural numbers. Here, the plurality of pass guides 260 may be provided to correspond to the number of the plurality of lead slots. Accordingly, the electrode leads 160 adjoining among the plurality of battery cells 110 form three pairs, and then the electrode leads 160 can pass through the lead slots via the respective pass guiders 260 to form a group of the electrode lead 160.

The number of the electrode leads 160 forming the group of electrode leads 160 is not limited to three, and may be changed according to the placement of the electrode leads of the positive electrode and the negative electrode of the battery cell 110.

Figure 3:
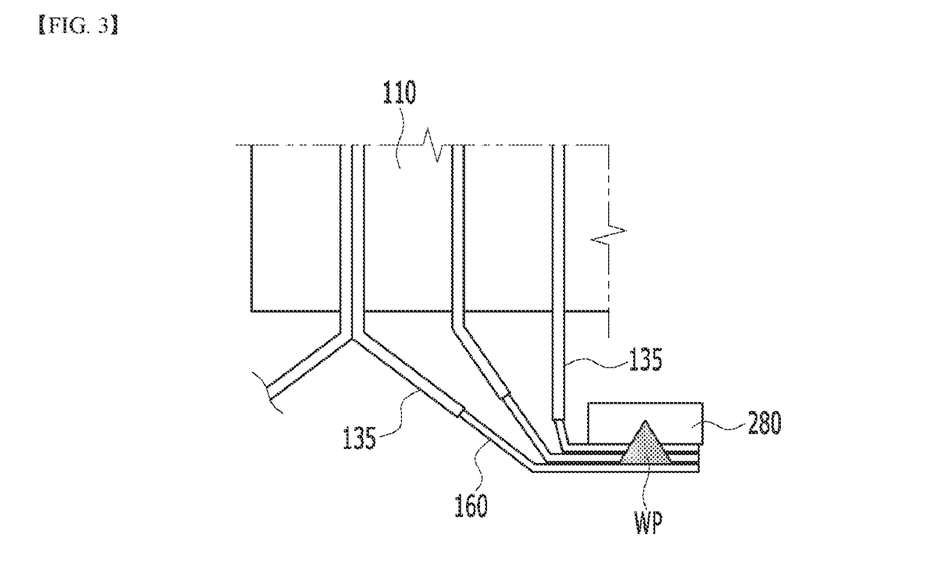
FIG. 3 is a plan view schematically showing a welded structure of an electrode lead and a bus bar according to an embodiment of the present disclosure.

FIG. 3 is a plan view schematically showing a welded structure of an electrode lead and a bus bar according to an embodiment of the present disclosure;

Referring to FIG. 3, a plurality of electrode leads 160 are protruded from a cell terrace 135 extending from a pouch covering the battery cells 110. The electrode leads 160 protruding from the cell terrace 135 can be bent in a direction in which a bus bar 280 is located. The bent electrode leads 160 can overlap with the same bus bar 280, and the plurality of electrode leads 160 and the bus bar 280 are simultaneously welded to form one welding portion WP.

When the electrode lead 160 and the bus bar 280 are welded, the physical properties of the welded portion are deteriorated due to the precipitation of intermetallic compounds and thus, tensile strength, fatigue life, and electrical conductivity can be deteriorated. In particular, as shown as an example in FIG. 3, the following restrictions occur in order to simultaneously weld a plurality of electrode leads 160. First, in order to weld the electrode leads 160 that become thicker by overlapping of the electrode leads 160, the specification of a welding machine must be enhanced. Second, as the number of the electrode leads 160 overlapping each other increases, the specification of the welding machine should be enhanced. Third, as the number of the electrode leads 160 overlapping each other increases, the welding deviation of each electrode lead 160 layer increases, which may cause a reduction in the welding quality. That is, the electrode lead 160 layer closest to the welding machine is excessively welded, and the layer of the electrode lead 160 located farther away from the welding machine may be weakly welded. Eventually, in the case of a non-plated bus bar, the physical properties of the welded portion cannot be secured. Intermetallic compounds are precipitated at a high concentration at the molten interface of the welded portion, and the welding strength can be significantly reduced.

The issues in which the intermetallic compound is precipitated at a high concentration and the welding strength is lowered will be described with reference to the comparative example of FIG. 4.

Figure 4:
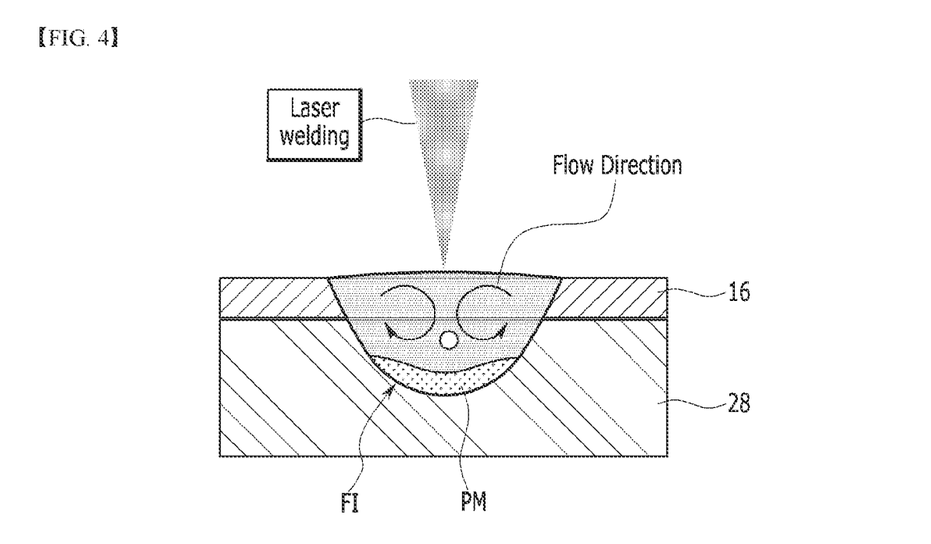
FIG. 4 is a plan view schematically showing a method of welding an electrode lead and a bus bar according to a comparative example.

FIG. 4 is a plan view schematically showing a method of welding an electrode lead and a bus bar according to a comparative example.

Referring to FIG. 4, the electrode lead 16 containing aluminum and the bus bar 28 containing copper are laser-welded. In the process of laser welding, materials move along the flow direction, and $CuAl_2$ precipitates (PM) are precipitated as an intermetallic compound at a high concentration at a welding interface (FI). These precipitates PM significantly reduce the welding strength, so that the electrode lead 16 and the bus bar 28 may be separated even by a small impact.

Figure 5:
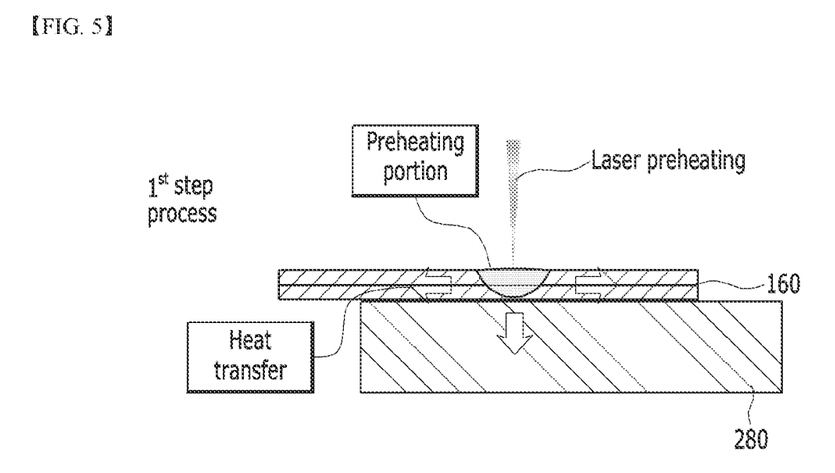
FIGS. 5 and 6 are plan views schematically showing a welding method according to an embodiment of the present disclosure.
Figure 6:
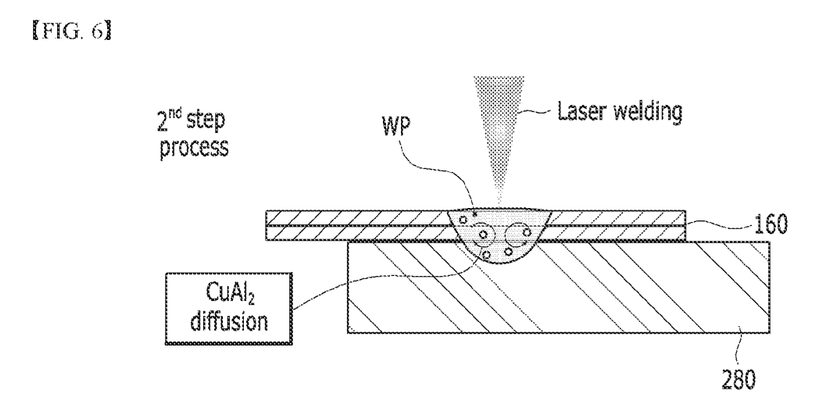

FIGS. 5 and 6 are plan views schematically showing a welding method according to an embodiment of the present disclosure.

Referring to FIG. 5, according to embodiments of the present disclosure, at least one of the electrode leads 160 can be overlapped with the same bus bar 280. Then, the electrode lead 160 and the bus bar 280 can be welded.

The step of welding the electrode lead 160 and the bus bar 280 includes a step of preheating the electrode lead 160 with a laser having a first energy. The first energy has a relatively lower magnitude than that of a welding step described later. Through such a preheating step, the alloy concentration can be controlled a welding step described later, thereby increasing the melt fluidity of the metals to be welded. It is preferable that the preheating portion formed in this step is formed only on the electrode lead 160. This is because when laser energy for preheating is transmitted to the bus bar 280, precipitates start to form.

When laser welding is performed, precipitates are easily formed by a rapid cooling, but according to embodiments of the present disclosure, the cooling time can be delayed by the preheating process to maximally increase the formation time of the precipitates. In addition, the surface cleaning and the absorption rate of the laser beam can be increased through the step of preheating the electrode leads 160.

Referring to FIG. 6, the preheated electrode lead 160 and the bus bar 280 can be welded with a laser having a second energy. At this time, the second enemy is larger than the first energy. In this step, a eutectic reaction between the first metal contained in the electrode lead 160 and the second metal contained in the bus bar 280 can be induced. The first metal contains aluminum, and the second metal contains copper.

When the eutectic reaction between the first metal and the second metal is induced, welding becomes possible at a lower temperature than the existing weldable temperature. For example, the eutectic reaction of aluminum-copper occurs at about 548 degrees Celsius, and at the eutectic temperature, the viscosity of the welded portion WP is the lowest, so that the fluidity may be very high. At the aluminum-copper eutectic reaction concentration, the fluidity of the molten metal increases, so that the distribution of intermetallic compounds precipitating at the welding interface can be lowered.

According to embodiments of the present disclosure, the welding speed of the preheating of the electrode leads 160 may be made higher than the welding speed of the preheated electrode lead 160 and the bus bar 280.

Hereinafter, the step of dispersing the precipitates occurring in the welded portion will be described with reference to FIG. 7.

Figure 7:
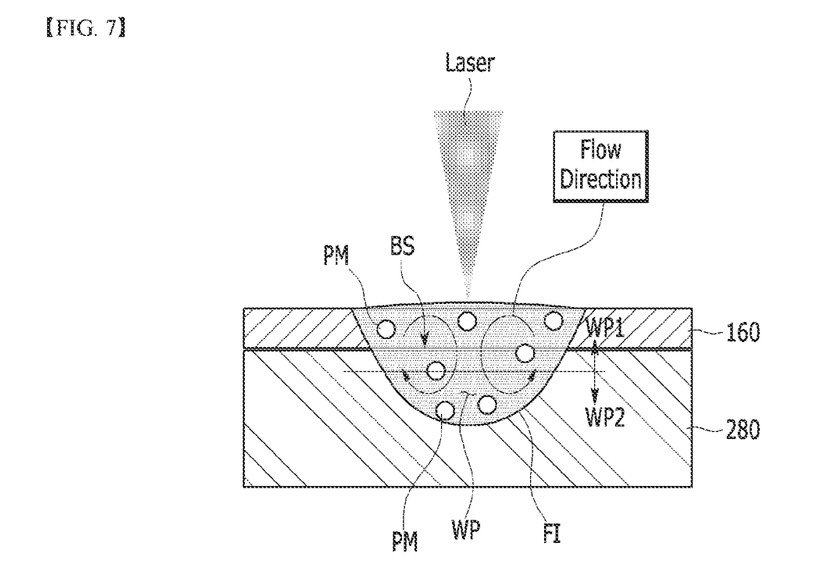
FIG. 7 is a view showing a welded portion formed by a welding method according to an embodiment of the present disclosure.

FIG. 7 is a view showing a welded portion formed by a welding method according to an embodiment of the present disclosure.

Referring to FIG. 7, the electrode lead 160 and the bus bar 280 are overlapped, and the electrode lead 160 and the bus bar 280 are welded to form a welded portion WP. The welded portion WP includes a first region WP1 in which the central portion is located in the electrode lead 160 based on the boundary surface BS between the electrode lead 160 and the bus bar 280, and a second region WP2 in which the central portion is located in the bus bar 280. During the welding process, the first metal forming the electrode lead 160 and the second metal forming the bus bar 280 can react to form precipitates PM. The precipitates PM according to embodiments of the present disclosure are distributed in both the first region WP1 and the second region WP2. Conventionally, most of the precipitates were formed at a high concentration at the welding interface FI due to low material fluidity in the welded portion WP, whereas according to embodiments of the present disclosure, the alloy of the first metal and the second metal is largely dispersed in the flow direction in the welded portion WP, so that precipitates PM may be formed in a small amount or almost no precipitates may be formed. In particular, the concentration of precipitates (PM) formed at the welding interface (FI) is very low, and the precipitates (PM) are minimized. Even if the precipitates PM are generated, the welding strength can be improved by dispersing them throughout the welded portion WP.

Figure 8:
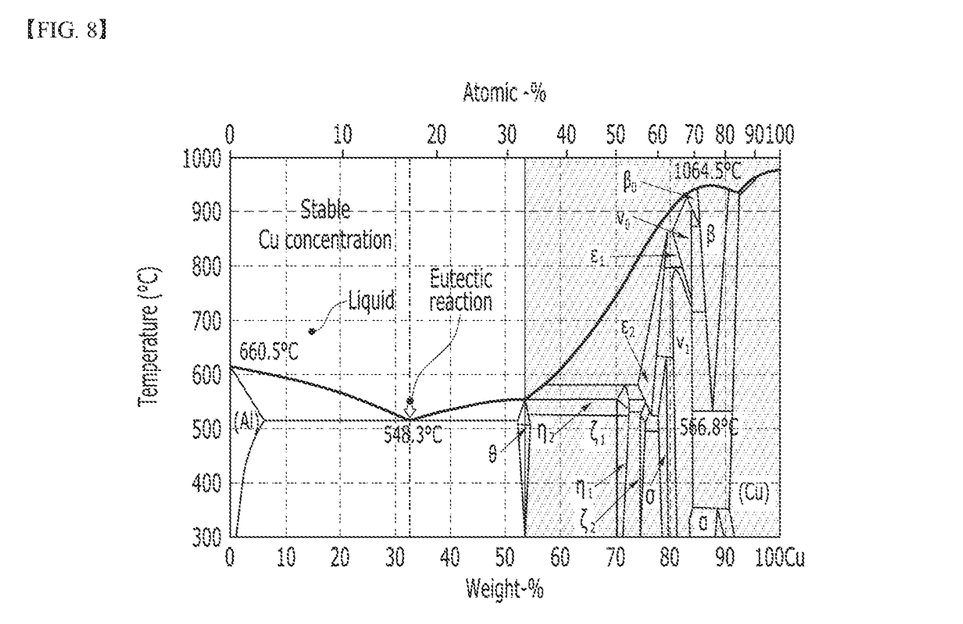
FIG. 8 is a graph showing a binary phase diagram of aluminum and copper.

FIG. 8 is a graph showing a binary phase diagram of aluminum and copper;

Referring to FIG. 8, in the welding process according to embodiments of the present disclosure, the alloy concentration of the second metal mixed with the first metal may be about 22 wt % to 52 wt %, preferably 30 wt % to 40 wt %, and more preferably, 32 wt % to 35 wt %. The above range is the temperature range at which the eutectic reaction occurs. As the temperature range is narrowed, more eutectic reactions occur, so that the fluidity of the molten metal is increased, thereby reducing the distribution in which intermetallic compounds are precipitated at the welding interface.

When the alloy concentration is less than the minimum value of 22 wt %, weld-penetration itself is less likely to occur during welding, and when the maximum value exceeds 52 wt %, the metals are not alloyed with each other and are joined to the compound. In the case of about 54 wt %, which exceeds the maximum value of 52 wt %, welding is a rapid cooling process unlike the general slow-cooling solidification process, and thus, there is a possibility that theta phase may be formed during solidification.

In the above-mentioned embodiments, the first metal contained in the electrode lead 160 and the second metal contained in the bus bar 280 are in contact with each other. As described above, according to embodiments of the present disclosure, even if a plating layer such as nickel is not formed between the electrode lead 160 and the bus bar 280, the welding strength can be improved.

In a modified embodiment, a third metal can be plated as a plating layer on the bus bar between the electrode lead and the bus bar. The third metal includes nickel, which forms a complete solid solution with copper forming the bus bar. In the complete solid solution, different phases do not appear in the liquid and solid phases and are completely dissolved in all composition ranges, so that intermetallic compounds are not formed. Therefore, nickel can completely dissolve copper at the welding interface, thereby suppressing the intermetallic compound precipitation reaction by aluminum-copper. Although the nickel plating layer is not necessarily required, if a nickel plating layer is added in addition to the above-mentioned welding method, there is an advantage in that better welding strength can be realized.

Figure 9:
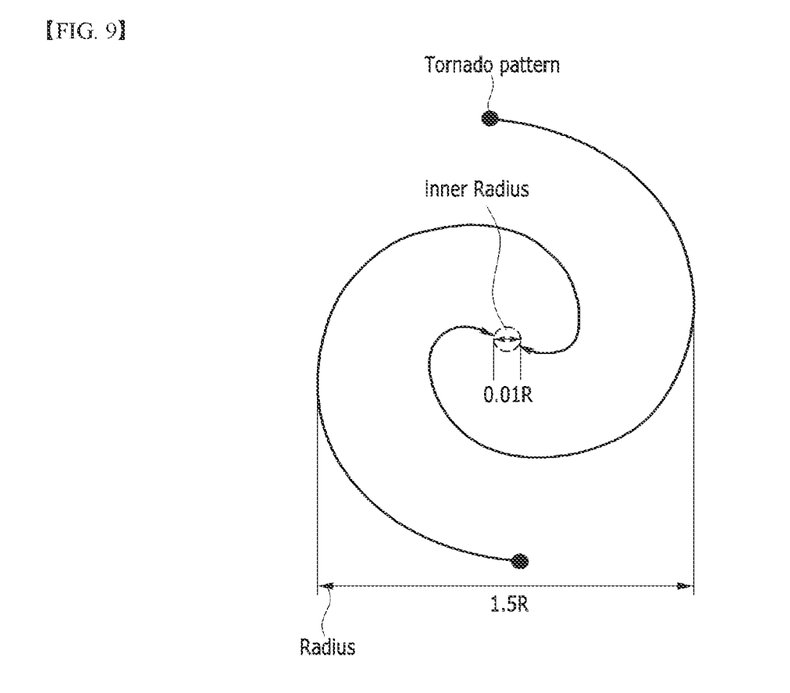
FIG. 9 is a view showing a laser welding beam according to a comparative example.
Figure 10:
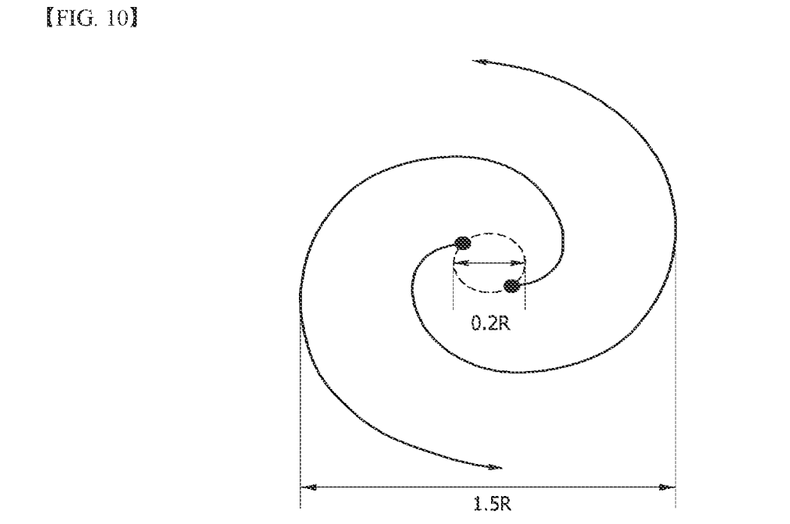
FIG. 10 is a view showing a laser welding beam according to embodiments of the present disclosure.

FIG. 9 is a view showing a laser welding beam according to a comparative example. FIG. 10 is a view showing a laser welding beam according to embodiments of the present disclosure.

Referring to FIG. 9, it is a pattern in which a laser beam is concentrated from outside to a center, and in this case, energy is concentrated on the central portion, and a deep and narrow weld-penetration can be formed in the central portion. In the case where such a laser welding beam is applied to this embodiment, when a deep and narrow melting portion is formed in the center of the bus bar, the laser plasma is emitted through a keyhole and thus, it interferes with the alloy reaction of the electrode lead with the second metal, and the concentration of the first metal of the bus bar may be increased at the lower end of the welded portion. As the concentration of the first metal increases at the interface of the welded portion, an intermetallic compound of the first metal and the second metal may be precipitated, and the welding strength may be sharply decreased.

Referring to FIG. 10, the laser welding beam according to embodiments of the present disclosure increases the radius of the central portion of tornado (e.g., the pattern of the laser forms multiple curved shapes extending in opposing directions), and the laser beam can be irradiated from a center to outside to reduce the energy density of the central portion. Therefore, the weld-penetration depth of the laser welded portion is flattened. Energy is evenly transmitted to the welded portion, making it easier to induce the eutectic reaction between the first metal and the second metal. After the preheating step, the welding step using the laser welding beam according to embodiments of the present disclosure described above is performed, and then subjected to a slow cooling process, so that the first metal and the second metal can be well mixed due to sufficient melt fluidity.

Meanwhile, one or more of the battery modules according to embodiments of the present disclosure can be packaged in a pack case to form a battery pack.

The above-mentioned battery module and a battery pack including the same may be applied to various devices. These devices can be applied to vehicle means such as an electric bicycle, an electric vehicle, a hybrid vehicle, but the present disclosure is not limited thereto and can be applied to various devices that can use the battery module and the battery pack includinu the same, which also belongs to the scope of the present disclosure.

Although the preferred embodiments of the present disclosure have been described in detail above, the scope of the present disclosure is not limited thereto, and various modifications and improvements made by those skilled in the art using the basic concepts of the present disclosure defined in the following claims also belong to the scope of rights.

DESCRIPTION OF REFERENCE NUMERALS

160: electrode lead
280: bus bar
FI: welding interface
WP: welded portion

The invention claimed is:

1. A battery module, comprising:
a battery cell stack in which a plurality of battery cells are stacked;
a bus bar frame connected to the battery cell stack;
at least one electrode lead connected to the battery cell stack and containing a first metal; and
a bus bar overlapping with the at least one electrode lead and containing a second metal,
wherein the at least one electrode lead and the bus bar are welded to form a welded portion,
wherein the welded portion consists of a first region in which a central portion is located in the at least one electrode lead and a second region in which the central portion is located in the bus bar, based on a boundary surface between the at least one electrode lead and the bus bar, and
wherein precipitates of the first metal and the second metal are distributed in both the first region and the second region.

2. The battery module of claim 1,
further comprising cell terraces that respectively protrude from the plurality of battery cells adjacent to each other among the battery cells contained in the battery cell stack,
wherein the at least one electrode lead includes a plurality of electrode leads protruding from the cell terraces, respectively, and the plurality of electrode leads have a same polarity, and
wherein the plurality of electrode leads overlap with the bus bar.

3. The battery module of claim 1,
further comprising a plating layer plated with a third metal on the bus bar between the plurality of electrode leads and the bus bar.

4. The battery module of claim 3, wherein:
the first metal comprises aluminum, and the second metal comprises copper.

5. The battery module of claim 4, wherein:
the plating layer comprises nickel.

6. The battery module of claim 1, wherein:
the precipitates are dispersed within the welded portion.

7. A method of manufacturing a battery module that includes a battery cell stack in which a plurality of battery cells are stacked, a bus bar frame connected to the battery cell stack, at least one electrode lead connected to the battery cell stack and containing a first metal, and a bus bar overlapping with the at least one electrode lead and containing a second metal, wherein the at least one electrode lead and the bus bar are welded to form a welded portion, wherein the welded portion comprises a first region in which a central portion is located in the at least one electrode lead and a second region in which the central portion is located in the bus bar, based on a boundary surface between the at least one electrode lead and the bus bar, and wherein precipitates of the first metal and the second metal are distributed in both the first region and the second region, the method comprising:
a step of stacking the plurality battery cells to form the battery cell stack,
wherein the at least one electrode lead includes a plurality of electrode leads;
a step of overlapping the bus bar with at least a first electrode of the plurality of electrode leads that respectively protrude from the battery cells adjacent to each other among the battery cells; and
a step of welding the at least first electrode lead and the bus bar,
wherein the step of welding the at least first electrode lead and the bus bar comprises:
a step of preheating the at least first electrode lead with a laser having a first energy; and
a step of welding the preheated at least first electrode lead and the bus bar with a laser having a second energy, and
wherein the first energy is lower than the second energy.

8. The method of claim 7, wherein:
the step of welding the at least first electrode lead and the bus bar comprises a step of inducing a eutectic reaction between the first metal contained in the at least first electrode lead and the second metal contained in the bus bar.

9. The method of claim 8, wherein:
in the step of welding the at least first electrode lead and the bus bar, an alloy concentration of the second metal mixed with the first metal is 22 wt % to 52 wt %.

10. The method of claim 7, wherein:
a welding speed of the step of preheating the at least first electrode lead is higher than a welding speed of the at least first preheated electrode leads and the bus bar.

11. The method of claim 7,
which further comprises a step of forming a plating layer plated with a third metal on the bus bar before the step of welding the at least first electrode lead and the bus bar.

12. The method of claim 7, wherein:
the laser has a pattern in which a laser beam is irradiated from a center to outside.

13. The method of claim 12, wherein:
the pattern of the laser forms at least one curved shape.

14. A method of welding an electrode lead and a bus bar, comprising:
a step of preheating the electrode lead with a laser having a first energy, and
a step of welding the preheated electrode lead and the bus bar with a laser having a second energy, to induce a eutectic reaction between a first metal contained in the electrode lead and a second metal contained in the bus bar,
wherein the first energy is lower than the second energy.

15. A battery pack comprising the battery module as set forth in claim 1.

16. The battery module of claim 1, wherein the precipitates of the first metal and the second metal in the first region are separated from each other by a distance.

17. The battery module of claim 1, wherein the precipitates of the first metal and the second metal in the second region are separated from each other by a distance.

18. The battery module of claim 1, wherein precipitates of the first metal and the second metal in the first region are separated from the precipitates of the first metal and the second metal in the second region by distances.

* * * * *